US011955719B1

(12) United States Patent
Al Ahmad et al.

(10) Patent No.: US 11,955,719 B1
(45) Date of Patent: Apr. 9, 2024

(54) ANTENNA SYSTEM COMPRISING TWO OPPOSITELY DIRECTED ANTENNAS AND METHODS FOR CONTROLLING TRANSMISSION OF RADIATION THROUGH A MULTI-LAYERED ANTENNA STRUCTURE

(71) Applicant: United Arab Emirates University, Al Ain (AE)

(72) Inventors: Mahmoud F. Y. Al Ahmad, Al Ain (AE); Abdul-Halim Jallad, Al Ain (AE)

(73) Assignee: United Arab Emirates University, Al Ain (AE)

( * ) Notice: Subject to any disclaimer, the term of this patent is extended or adjusted under 35 U.S.C. 154(b) by 0 days.

(21) Appl. No.: 18/535,738

(22) Filed: Dec. 11, 2023

(51) Int. Cl.

| | |
|---|---|
| ***H01Q 1/38*** | (2006.01) |
| ***H01C 7/108*** | (2006.01) |
| ***H01L 27/24*** | (2006.01) |
| ***H01L 45/00*** | (2006.01) |
| ***H01Q 3/28*** | (2006.01) |

(52) U.S. Cl.
CPC ............... *H01Q 3/28* (2013.01); *H01C 7/108* (2013.01)

(58) Field of Classification Search
CPC .. H01Q 1/36; H01Q 1/38; H01Q 3/28; H01Q 21/30; H01C 7/10; H01L 27/108; H01L 27/12; H01L 27/18; H01L 27/24; H01L 21/76; H01L 21/762; H01L 45/00
See application file for complete search history.

(56) References Cited

U.S. PATENT DOCUMENTS

| | | | | |
|---|---|---|---|---|
| 6,292,143 | B1 * | 9/2001 | Romanofsky | H01Q 25/04 343/700 MS |
| 6,326,931 | B1 * | 12/2001 | Falk | H01Q 15/141 343/757 |
| 6,342,866 | B1 * | 1/2002 | Ho | H01Q 9/065 343/909 |
| 7,466,269 | B2 | 12/2008 | Haziza | |
| 9,793,322 | B2 * | 10/2017 | Ge | H10N 70/24 |
| 9,923,267 | B1 * | 3/2018 | Pala | H01Q 3/01 |
| 10,326,205 | B2 | 6/2019 | Haziza | |
| 10,439,134 | B2 * | 10/2019 | Majhi | H10N 70/821 |
| 11,296,401 | B2 | 4/2022 | Kim et al. | |

FOREIGN PATENT DOCUMENTS

| | | |
|---|---|---|
| EP | 2937938 | 10/2015 |
| WO | 2007058721 | 5/2007 |

* cited by examiner

*Primary Examiner* — Tho G Phan
(74) *Attorney, Agent, or Firm* — Boyle Fredrickson, S.C.

(57) ABSTRACT

The technology disclosed relates to an antenna system comprising two oppositely directed antennas integrated in a structure including two layers of resistivity switching material, and methods for controlling transmission of radiation through the layers of resistivity switching material to thereby allow for simultaneous and switchable transmission of antenna radiation in two opposite directions.

16 Claims, 2 Drawing Sheets

ANTENNA SYSTEM COMPRISING TWO OPPOSITELY DIRECTED ANTENNAS AND METHODS FOR CONTROLLING TRANSMISSION OF RADIATION THROUGH A MULTI-LAYERED ANTENNA STRUCTURE

FIELD OF THE INVENTION

The technology disclosed relates to an antenna system comprising two oppositely directed antennas integrated in a structure including two layers of resistivity switching material, and methods for controlling transmission of radiation through the layers of resistivity switching material to thereby allow for simultaneous and switchable transmission of antenna radiation in two opposite directions.

In particular, the technology disclosed relates to an antenna system comprising two oppositely directed antennas integrated in a single structure including two layers of resistivity switching material each arranged between a pair of electrically conductive electrode layers and where the properties of the resistivity switching material may be changed from a high resistivity state to a low resistivity state by applying a DC bias voltage to the pair of electrically conductive electrode layers, thereby controlling the transmission of the radiation emitted by the respective antenna through the respective layer of resistivity switching material.

BACKGROUND OF THE INVENTION

In state-of-the-art satellite systems for space applications, it is known to have an antenna system that comprises a plurality of antennas where at least two of the antennas are mutually directed in opposite directions and where a ground link antenna of the satellite is configured and arranged for communication with a ground station.

It is also known in the art to achieve a plurality of different antenna patterns, polarization directions or states from an antenna structure comprising a first and second antenna layer by using a phase change material (PCM) configured to be selectively switched between phases.

For a variety of applications, there is a need for an antenna system adapted for both simultaneous transmission of radiation in opposite directions and that allows for dynamically switching direction of the radiation transmitted from the antenna system.

As an example, in various industries including the aerospace and automotive industries there is a current need for a relatively compact antenna system comprising a plurality of antennas that is adapted for both simultaneous transmission of radiation in opposite directions and for dynamically switching direction of the radiation transmitted from the antenna system.

BRIEF SUMMARY OF THE INVENTION

The objective of the technology disclosed is therefore to provide an antenna system that is adapted for both simultaneous transmission of radiation in opposite directions and a method for dynamically switching direction of the radiation transmitted from the antenna system.

Other objectives of the technology disclosed include to allow for both simultaneous and switchable transmission of radiation in opposite directions in an antenna system comprising two oppositely directed antennas yet ensuring relatively high performance of the individual antennas and a relatively compact size for the overall antenna system.

The technology relates to an antenna system comprising two oppositely directed antennas integrated in a multi-layered structure, typically integrated in a single structure, including two layers of resistivity switching material. Each of the two layers of resistivity switching material is arranged between a pair of electrically conductive electrode layers that each are substantially transparent to the radiation from their respective antenna.

The properties of the resistivity switching material of each of the two layers of resistivity switching material are adapted to change from a high resistivity state to a low resistivity state with a DC bias voltage applied to their respective pair of conductive electrode layers to thereby control the transmission of radiation from the respective antenna through the respective layer of resistivity switching material.

The antenna system typically comprises a control system and at least one power supply unit for applying a DC bias voltage to the respective pair of conductive electrode layers. A radio frequency current is typically applied by a feeding system to respective of the two oppositely directed antennas. The control system may then be configured to control whether a DC bias voltage is applied to none of the two pairs of conductive electrode layers, to one of the two pairs of conductive electrode layers or simultaneously to both pairs of conductive electrode layers in order to control the radiation through the respective layer of resistivity switching material and thereby the radiation from the antenna system comprising the two oppositely directed antennas.

The technology disclosed relates to an antenna system comprising two oppositely directed antennas integrated in a multi-layered structure, typically integrated in a single structure including two layers of resistivity switching material where each of the two layers of resistivity switching material is arranged between a pair of electrically conductive electrode layers of the multi-layered structure that each are substantially transparent to the radiation from their respective antenna. The properties of the resistivity switching material of each of the two layers of resistivity switching material are adapted to change from a high resistivity state to a low resistivity state with a DC bias voltage applied to their respective pair of conductive electrode layers to allow for control of the transmission of radiation from the respective of the two oppositely directed antennas through their respective layer of resistivity switching material.

In embodiments, at least one of the two layers of resistivity switching material comprises a metal oxide material that is configured to change from a high resistivity state to a low resistivity state when arranged between the pair of conductive electrode layers to which a DC bias voltage is applied. The at least one of the two layers of resistivity switching material may then be made of, or at least comprise, Vanadium Oxide (VOX) as the resistivity switching material.

In embodiments, the layers of each of the two pairs of electrically conductive electrode layers comprise a high resistive material that is substantially transparent to the radiation from their respective antenna. The layers of at least one of the two pairs of electrically conductive electrode layers may then be made of, or at least comprise, Indium Tin Oxide (ITO) as the high resistive material.

In embodiments, the antenna system further comprises a common ground metallization layer arranged between the two oppositely directed antennas and configured to provide ground to the antenna system. The common ground metallization layer may then be one of the layers of the single structure of the multi-layered antenna system.

In embodiments, the antenna system further comprises at least one power supply unit for supplying a DC bias voltage to the respective pair of conductive electrode layers so that the properties of a resistivity switching material arranged between the respective pair of conductive electrode layers change from a high resistivity state to a low resistivity state, thereby changing transmission of antenna radiation through the resistivity switching material.

In embodiments, the antenna system further comprises a control system for controlling when a DC bias voltage is applied to the respective pair of conductive electrode layers to thereby control the transmission of antenna radiation through the respective layer of resistivity switching material. The control system may then comprise a switching arrangement including at least one switch for controlling when a DC bias voltage is applied to the respective pair of conductive electrode layers.

In aspects, the technology disclosed relates to a method for controlling radiation from an antenna system by applying a DC bias voltage to at least one of two pairs of conductive electrode layers so that a resistivity switching material arranged between the pair of electrically conductive electrode layers changes from a high resistivity state to a low resistivity state with the applied DC bias.

In aspects, the technology disclosed relates to a method for controlling radiation from an antenna system comprising two oppositely directed antennas integrated in a multi-layered structure including two layers of resistivity switching material where each of the two layers of resistivity switching material is arranged between a pair of electrically conductive electrode layers that each are substantially transparent to the radiation from their respective antenna, the method comprising: applying a DC bias voltage to at least one of the two pairs of conductive electrode layers so that the resistivity switching material arranged between the pair of electrically conductive electrode layers changes from a high resistivity state to a low resistivity state with the applied DC bias, thereby allowing for transmission of a substantial portion of the radiation from at least one of the antennas through the layer of resistivity switching material arranged between the at least one pair of conductive electrode layers to which a DC voltage is applied.

In embodiments, the above method may further comprise supplying feed signals to the respective of the two oppositely directed antennas, and transmitting, simultaneously from each of the two oppositely directed antennas, radiation by converting the power in the respective feed signals to transmitted radio waves. A DC bias voltage may then be applied to at least one of the two pairs of conductive electrode layers while feed signals are supplied to each of the two antennas. The method may thus comprise applying the DC bias voltage to at least one of the two pairs of conductive electrode layers during transmission/emission of radiation from each of the two oppositely directed antennas.

In embodiments, the method is further comprising controlling, by a control system and using at least one power supply unit for applying a DC bias voltage to the at least one pair of conductive electrode layers, the transmission of radiation from the respective of the two oppositely directed antennas through their respective layer of resistivity switching material arranged between a pair of conductive electrode layers.

In embodiments, the method is further comprising at least one of sequentially and simultaneously applying a DC bias voltage to different pairs of conductive electrode layers to thereby control the transmission of radiation from the respective of the two oppositely directed antennas through their respective layer of resistivity switching material arranged between different pairs of conductive electrode layers.

In embodiments, the method is comprising controlling, by a control system controlling a switching arrangement, whether each of the two oppositely directed antennas are currently transmitting radiation through their respective layer of resistivity switching material by selectively applying, under the control of the control system, a DC bias voltage to their respective pair of conductive electrode layers.

In embodiments, the method is further comprising selectively controlling, by the control system controlling a switching arrangement comprising at least one switch, whether a DC bias voltage is applied to none of the two pairs of conductive electrode layers, to one of the two pairs of conductive electrode layers or simultaneously to both pairs of conductive electrode layers, thereby controlling the radiation transmitted from the antenna system in two separate directions from the antenna system by controlling which of the two antennas are currently transmitting radiation through their respective layer of resistivity switching material.

DETAILED DESCRIPTION

Figure 1:
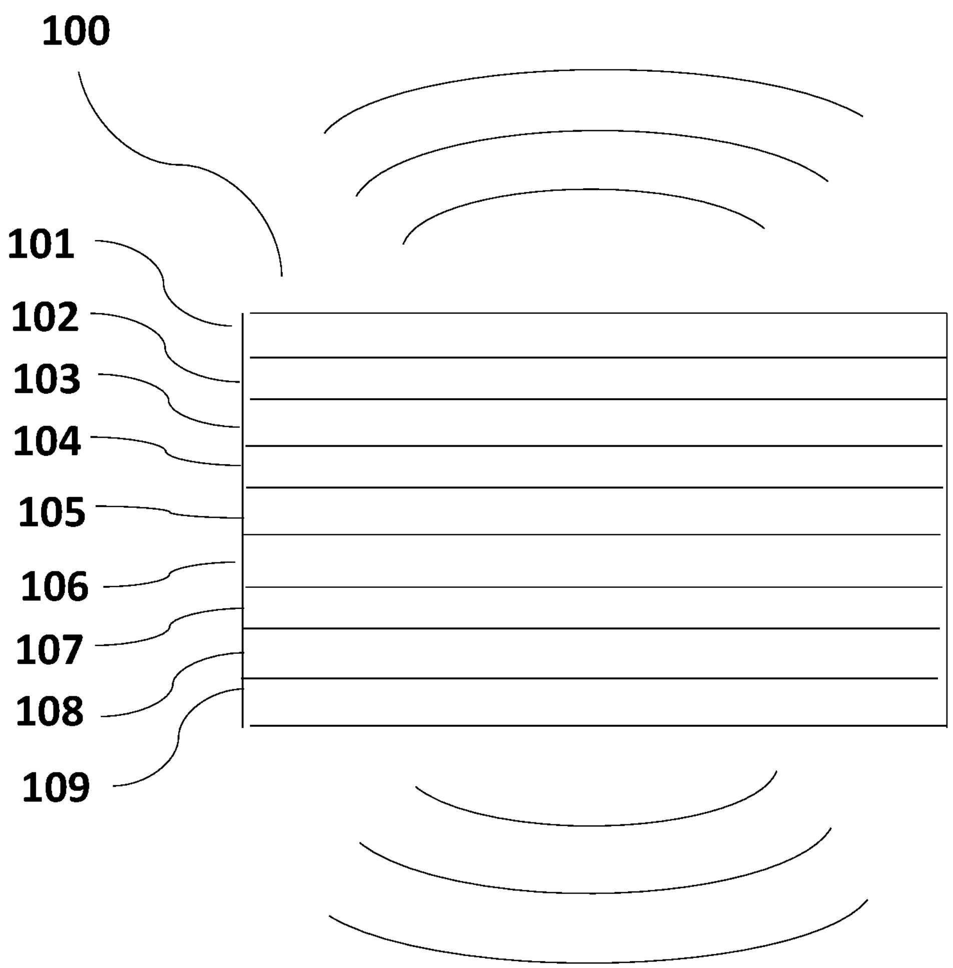
FIG. 1 illustrates an example embodiment of an antenna system according to the technology disclosed.

The core of technology disclosed is an integrated antenna system that allows for simultaneous and switchable transmission of radiation in opposite directions.

The technology disclosed relates to an antenna system comprising two antennas integrated in a structure, preferably a single structure, including two layers of resistivity switching material, and methods for controlling transmission of radiation through the layers of resistivity switching material to thereby allow for simultaneous and switchable transmission of antenna radiation in two main directions. The two antennas are typically two oppositely directed antennas, i.e. they are typically directed substantially at 180 degrees with respect to each other.

The technology disclosed allows for both simultaneous and switchable transmission of radiation in opposite directions in an antenna system comprising two oppositely directed antennas yet ensuring relatively high performance of the individual antennas and a relatively compact size for the overall antenna system. This may open doors for a variety of applications in various industries such as the aerospace and automotive industries.

In aspects, the technology disclosed relates to an antenna system comprising two antennas integrated in a structure, typically and preferably a single structure, that is relatively compact, including two layers of resistivity switching material, and methods for controlling the transmission of radiation through the layers of resistivity switching material to thereby allow for simultaneous and switchable transmission of Radio Frequency (RF) radiation in opposite directions. The antennas may typically be directed at 180 degrees with respect to each other.

In aspects and embodiments of the technology disclosed, each of the two layers of resistivity switching material is arranged between a pair of electrically conductive electrode layers that are substantially transparent to the radiation from their respective antenna. By applying a DC bias voltage to at least one of the pairs of electrically conductive electrode layers, the properties of the resistivity switching material changes from a high resistivity state to a low resistivity state to allow for transmission of antenna radiation through the respective layer of resistivity switching material, thereby controlling the radiation in two opposite directions from the antenna system.

The technology disclosed provides a solution for controlling and switching between two oppositely directed antennas of an antenna system, allowing radiation from either of the antennas to be transmitted from the antenna system at any one time, switching between them to allow for changing the direction of the radiation transmitted from the antenna system, and simultaneously transmitting radiation in two opposite directions from the antenna system.

The antenna system is thus configured to control transmission of electromagnetic radiation through the layers of the antenna structure. A layer of state-change material such as VOX is capable of being reversibly transitioned between a high-resistivity state and a low-resistivity state by applying and then not applying a DC bias voltage to a pair of electrically conductive electrode layers between which the layer of state-change material is arranged. Transmission of electromagnetic radiation through the layer of state-change material is controllable by transitioning the state-change material between the high-resistivity state and the low-resistivity state.

The antenna system and method of the technology disclosed effectively achieves high flexibility as the direction of the radiation from an antenna system comprising two oppositely directed antennas may dynamically be changed or switched by applying a DC bias voltage that changes the properties of a state-change material, or a resistivity switching material. The layer of state-change material, or resistivity switching material, is typically sandwiched between a pair of electrically conductive electrode layers and the DC bias voltage may be applied to the pair of electrically conductive electrode layers with the help of wiring and contact. The pair of electrically conductive electrode layers are typically made of a transparent material, for example a high resistive material, that substantially does not affect the propagation of the radiation emitted by the respective antenna when no DC bias voltage is applied.

In embodiments, the technology disclosed provides a simple and compact solution for controlling and switching between two oppositely directed antennas integrated in a single structure, allowing transmission using either of the antennas at any one time, switching between them to allow for changing the direction of the radiation transmitted from the single structure, and simultaneously transmitting radiation in two opposite directions from the single structure. The technology disclosed effectively achieves high flexibility as the direction of the radiation from the single structure comprising two oppositely directed antennas may easily be changed or switched by applying a DC bias voltage that changes the properties of a resistivity switching material.

In various embodiments, the antenna system of the technology disclosed typically comprises two oppositely directed antennas integrated in a substantially symmetrical pattern on a compact single structure. Each sub-structure may then comprise four layers, in addition to a fifth layer that is a common ground metallization providing ground to the antenna system and that is separating the two oppositely directed sub-structures.

In certain embodiments, the first (top) layer and the third layer of each of the two symmetrical sub-structures may for example be made up of Indium Tin Oxide (ITO), a material that is transparent to RF signals and electrically conductive. A (second) layer made of a resistivity switching material such as Vanadium Oxide (VOX) is arranged, for example sandwiched, between the electrically conductive first and third layers. The electrically conductive first and third layers are typically made of a high resistive material that typically is configured to substantially not affect the propagation of the RF signals.

In embodiments, the properties of the respective resistivity switching material may be controlled through the application of an electrical bias, for example a DC bias voltage is applied to the pair of ITO layers, which will in turn impact the VOX material state. The excitation of the VOX material will lead to a radiated pattern that is minimally distorted by the ITO layers. Thus, a DC bias is applied across the layer of VOX material through the pair of ITO layers. The pair of ITO-layers will allow a current to propagate, but the propagation will substantially not affect the conductivity of the ITO layers. The layer of VOX material will substantially not affect the radiation pattern. However, radiation from the antennas may be attenuated by a small amount through the layer of VOX material, i.e. the layer of VOX material may slightly affect gain and/or directivity.

Hence, through the electrical bias, or DC bias voltage, applied to the ITO layers it is possible to control and switch between the two oppositely directed antennas. It is thus possible to control and switch between the antennas, allowing transmission of radiation from either of the two oppositely directed antennas to pass through their respective layer of resistivity switching material at any one time, switching between them, and simultaneously transmitting radiation in opposite directions from the antenna system by allowing for the transmission of radiation through the respective layer of resistivity switching material. ITO is a transparent and conductive metal oxide that includes Indium, Tin and Oxygen and that substantially does not affect the propagation of a microwave signal such as the radio wave signal emitted by the respective antenna of the technology disclosed.

In aspects, the technology disclosed relates to a method for controlling radiation from an antenna system by applying a DC bias voltage to at least one of two pairs of conductive electrode layers so that a resistivity switching material arranged between the pair of electrically conductive electrode layers changes from a high resistivity state to a low resistivity state with the applied DC bias.

In aspects, the technology disclosed relates to a method for controlling radiation from an antenna system comprising two oppositely directed antennas integrated in a multi-layered structure including two layers of resistivity switching material where each of the two layers of resistivity switching material is arranged between a pair of electrically conductive electrode layers that each are substantially transparent to the radiation from their respective antenna, the method comprising: applying a DC bias voltage to at least one of the two pairs of conductive electrode layers so that the resistivity switching material arranged between the pair of electrically conductive electrode layers changes from a high resistivity state to a low resistivity state with the applied DC bias, thereby allowing for transmission of a substantial portion of the radiation from at least one of the antennas through the layer of resistivity switching material arranged between the at least one pair of conductive electrode layers to which a DC voltage is applied.

In example embodiments of the technology disclosed, each of the two pairs of conductive electrode layers with their respective sandwiched layer of resistivity switching material is a structure that typically is configured to substantially block the radiation from their respective antenna when no DC voltage bias is applied to the respective pair of conductive electrode layers. When a DC voltage bias is applied to the pair of conductive electrode layers, the resistivity switching material arranged between the pair of electrically conductive electrode layers changes from a high resistivity state to a low resistivity state in that an excitation of the resistivity switching material will lead to that the radiation from the respective antenna is minimally distorted by the structure comprising the pair of conductive electrode layers and the resistivity switching material arranged between the pair of electrically conductive electrode layers.

The antenna system according to the technology disclosed may further comprise a control system and at least one power supply unit for applying a DC bias voltage to the respective pair of conductive electrode layers.

The control system may further comprise a switching arrangement for controlling when a DC bias voltage is applied to the respective pair of conductive electrode layers. The switching arrangement may comprise at least one switch for selectively controlling whether a DC bias voltage is applied to none of the two pairs of conductive electrode layers, to one of the two pairs of conductive electrode layers or simultaneously to both pairs of conductive electrode layers. The at least one of the two layers of resistivity switching material may then comprise a state-change material such as a metal oxide that changes from a high resistivity state to a low resistivity state with an applied DC bias voltage, for example Vanadium Oxide (VOX). The layers of at least one of the two pairs of electrically conductive electrode layers may comprise a transparent and conductive material such as Indium Tin Oxide (ITO).

In aspects, the technology disclosed relates to a method for controlling the transmission of radio waves through a single structure including a control system and two layers of resistivity switching material where each of the two layers of resistivity switching material is arranged between a pair of electrically conductive electrode layers that each are substantially transparent to the radio waves. The method comprises applying, under the control of the control system, an electrical bias to at least one of the two pairs of conductive electrode layers so that the resistivity switching material arranged between the at least one pair of electrically conductive electrode layers changes from a high resistivity state to a low resistivity state with the applied DC bias, thereby controlling the transmission of radiation through the layer of resistivity switching material arranged between the at least one pair of conductive electrode layers to which a DC voltage is applied.

In aspects, the technology disclosed relates to a method for controlling the radiation from two oppositely directed antennas integrated in a single structure including a control system and two layers of resistivity switching material where each of the two layers of resistivity switching material is arranged between a pair of electrically conductive electrode layers that each are substantially transparent to the radiation from their respective antenna, said method comprising:

- feeding radio frequency current signals to the two antennas,
- transmitting, simultaneously from each of the two antennas, radiation by converting the power in the radio frequency current signals to radio waves; and
- applying, during the transmission of radiation from each of the two antennas and under the control of the control system, a DC bias voltage to at least one of the two pairs of conductive electrode layers so that the resistivity switching material arranged between the at least one pair of electrically conductive electrode layers changes from a high resistivity state to a low resistivity state with the applied DC bias, thereby controlling the transmission of radiation through the layer of resistivity switching material arranged between the at least one pair of conductive electrode layers to which a DC voltage is applied.

The above method may comprise at least one of sequentially and simultaneously applying a DC bias voltage to different pairs of conductive electrode layers to thereby control the transmission of radiation from the respective of the two oppositely directed antennas through their respective layer of resistivity switching material arranged between different pairs of conductive electrode layers.

The method may further comprise controlling, by a control system and using at least one power supply unit for applying a DC bias voltage to the respective pair of conductive electrode layers, the transmission of radiation from the respective of the two oppositely directed antennas through their respective layer of resistivity switching material arranged between a pair of conductive electrode layers.

The method may further comprise controlling, by a control system, whether each of the two oppositely directed antennas are currently transmitting radiation by selectively applying a DC bias voltage to their respective pair of conductive electrode layers.

The method may further comprise selectively controlling, by the control system, whether a DC bias voltage is applied to none of the two pairs of conductive electrode layers, to one of the two pairs of conductive electrode layers or simultaneously to both pairs of conductive electrode layers, thereby controlling which of the two antennas are currently transmitting radiation through their respective layer of resistivity switching material.

The antenna system of the technology disclosed may further comprise a radio transmitter that is typically connected to the respective antenna which emits the radio waves. In electronics and telecommunications, a radio transmitter is an electronic device which produces radio waves with an antenna. The transmitter itself typically generates a radio frequency alternating current, which is applied to the antenna. When excited by this alternating current, the antenna radiates radio waves.

The antenna feed system or antenna feed is the cable or conductor, and other associated equipment, which connects the transmitter or receiver with the antenna and makes the two devices compatible. In a radio transmitter, the transmitter generates an alternating current of radio frequency, and the feed system feeds the current, or feed signal, to the antenna, which converts the power in the current to radio waves.

In a radio antenna, the feed line (feedline), or feeder, is typically a cable or other transmission line that connects the antenna with the radio transmitter. In order to carry RF current efficiently, the feed lines are typically made of specialized types of cable called transmission line. The most widely used types of feed line are coaxial cable, twin-lead, ladder line, and at microwave frequencies, waveguide.

FIG. 1 illustrates an example embodiment of an antenna system (100) according to the technology disclosed comprising two oppositely directed antennas (104, 106) that are integrated in a single structure including two layers of resistivity switching material (102, 108).

In FIG. 1, the first layer of resistivity switching material (102) is arranged between a first pair of electrically conductive electrode layers (101, 103) and the second layer of resistivity switching material (108) is arranged between a second pair of electrically conductive electrode layers (107, 109) of the multi-layered single structure illustrated.

The example embodiment of an antenna system (100) illustrated in FIG. 1 comprises two oppositely directed antennas (104, 106) integrated in a substantially symmetrical pattern on a single structure. Each symmetrical sub-structure in FIG. 1 comprises four layers, in addition to a fifth layer (105) that is a common ground metallization providing ground to the antenna system (100) and that is separating the two symmetrical sub-structure in FIG. 1.

The properties of the resistivity switching material of each of the two layers of resistivity switching material (102, 108) in FIG. 1 are adapted to change from a high resistivity state to a low resistivity state with a DC bias voltage applied to their respective pair of conductive electrode layers (101, 103, 107, 109) to thereby control the transmission of the radiation from the respective antenna through the respective layer of resistivity switching material (102, 108). As mentioned above, the example embodiment of a multi-layered antenna system (100) illustrated in FIG. 1 further comprises a common ground metallization layer (105) arranged between the two oppositely directed antennas (104, 106).

Figure 2:
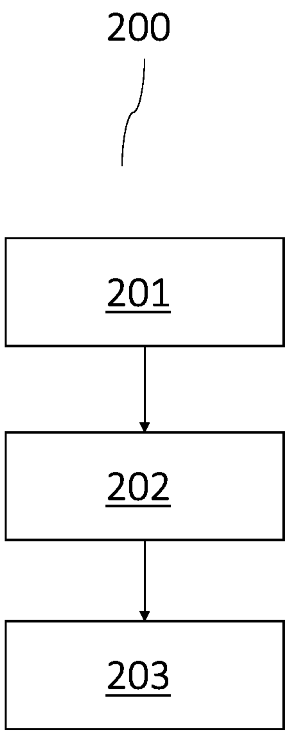
FIG. 2 is a flowchart illustrating a method according to an example embodiment of the technology disclosed.

FIG. 2 is a flowchart illustrating a method according to an example embodiment of the technology disclosed.

Step 201: Feeding, by the feeder system of an antenna system, radio frequency current signals to two oppositely directed antennas of the antenna system.

Step 202: Transmitting, simultaneously from the two oppositely directed antennas, radiation in opposite directions by converting the power in the radio frequency current signals to radio waves.

Step 203: Applying, during the transmission of radiation from the two antennas, a DC bias voltage to at least one of two pairs of conductive electrode layers of the antenna system so that a resistivity switching material arranged between the at least one pair of electrically conductive electrode layers changes from a high resistivity state to a low resistivity state with the applied DC bias.

We claim:

1. An antenna system comprising two oppositely directed antennas integrated in a multi-layered structure including two layers of resistivity switching material, wherein each of the two layers of resistivity switching material is arranged between a pair of electrically conductive electrode layers of the multi-layered structure that each are substantially transparent to the radiation from their respective antenna, and wherein properties of the resistivity switching material of each of the two layers of resistivity switching material are adapted to change from a high resistivity state to a low resistivity state with a DC bias voltage applied to their respective pair of conductive electrode layers to allow for control of the transmission of radiation from the respective of the two oppositely directed antennas through their respective layer of resistivity switching material.

2. The antenna system according to claim 1, wherein the layers of at least one of the two pair of layers of resistivity switching material comprises a metal oxide material that is configured to change from a high resistivity state to a low resistivity state when arranged between a pair of conductive electrode layers to which a DC bias voltage is applied.

3. The antenna system according to claim 1, wherein at least one of the two layers of resistivity switching material comprises Vanadium Oxide (VOX).

4. The antenna system according to claim 1, wherein the layers of each of the two pairs of electrically conductive electrode layers comprise a high resistive material that is substantially transparent to the radiation from their respective antenna.

5. The antenna system according to claim 1, wherein the layers of at least one of the two pairs of electrically conductive electrode layers comprise Indium Tin Oxide (ITO).

6. The antenna system according to claim 1, wherein said antenna system further comprises a common ground metallization layer arranged between the two oppositely directed antennas and configured to provide ground to the antenna system.

7. The antenna system according to claim 1, wherein said antenna system further comprises at least one power supply unit for applying a DC bias voltage to the respective pair of conductive electrode layers.

8. The antenna system according to claim 1, wherein said antenna system further comprises a control system for controlling when a DC bias voltage is applied to the respective pair of conductive electrode layers to thereby control the transmission of antenna radiation through the respective layer of resistivity switching material.

9. The antenna system according to claim 8, wherein said control system comprises a switching arrangement comprising at least one switch for controlling when a DC bias voltage is applied to the respective pair of conductive electrode layers.

10. A method for controlling radiation from an antenna system comprising two oppositely directed antennas integrated in a multi-layered structure including two layers of resistivity switching material where each of the two layers of resistivity switching material is arranged between a pair of electrically conductive electrode layers that each are substantially transparent to the radiation from their respective antenna, said method comprising:

applying a DC bias voltage to at least one of the two pairs of conductive electrode layers so that the resistivity switching material arranged between the pair of electrically conductive electrode layers changes from a high resistivity state to a low resistivity state with the applied DC bias, thereby controlling transmission of radiation from at least one of the antennas through the layer of resistivity switching material arranged between the at least one pair of conductive electrode layers to which a DC voltage is applied.

11. The method according to claim 10, said method further comprising:

supplying feed signals to the respective of the two oppositely directed antennas, and transmitting, simultaneously from each of the two oppositely directed antennas, radiation by converting the power in the respective feed signals to transmitted radio waves.

12. The method according to claim 10, wherein the DC bias voltage is applied to at least one of the two pairs of conductive electrode layers while radiation is transmitted from each of the two oppositely directed antennas.

13. The method according to claim 10, said method further comprising:

controlling, by a control system and using at least one power supply unit for applying a DC bias voltage to the at least one pair of conductive electrode layers, the transmission of radiation from the respective of the two oppositely directed antennas through their respective layer of resistivity switching material arranged between a pair of conductive electrode layers.

14. The method according to claim 10, said method further comprising at least one of sequentially and simultaneously applying a DC bias voltage to different pairs of conductive electrode layers to thereby control the transmission of radiation from the respective of the two oppositely directed antennas through their respective layer of resistivity switching material arranged between different pairs of conductive electrode layers.

15. The method according to claim 10, said method comprising controlling, by a control system controlling a switching arrangement, whether each of the two oppositely directed antennas are currently transmitting radiation through their respective layer of resistivity switching material by selectively applying, under the control of the control system, a DC bias voltage to their respective pair of conductive electrode layers.

16. The method according to claim 10, said method comprising selectively controlling, by the control system controlling a switching arrangement comprising at least one switch, whether a DC bias voltage is applied to none of the two pairs of conductive electrode layers, to one of the two pairs of conductive electrode layers or simultaneously to both pairs of conductive electrode layers, thereby controlling the radiation transmitted from the antenna system by controlling which of the two antennas are currently transmitting radiation through their respective layer of resistivity switching material.

* * * * *